Nov. 6, 1962   F. SULLIVAN ETAL   3,062,417
SAFETY DEVICE FOR TILTING VALVE
Filed April 25, 1961

INVENTORS
FREDERICK SULLIVAN
THOMAS G. TATOSIAN
BY
Pennie Edmonds Morton Burrows Taylor
ATTORNEYS United States Patent Office 3,062,417
Patented Nov. 6, 1962

3,062,417
SAFETY DEVICE FOR TILTING VALVE
Frederick Sullivan, Wilmington, and Thomas G. Tatosian, Tewksbury, Mass., assignors to Arthur D. Little, Inc., Cambridge, Mass., a corporation of Massachusetts
Filed Apr. 25, 1961, Ser. No. 105,348
4 Claims. (Cl. 222—394)

This invention relates to improvements in safety devices for tilting valves of the "nozzle-down" type used on pressurized containers, and includes an improved safety device or attachment for applying to and for use with such valves, and containers having valves with the safety device attached thereto.

Tilting valves of the "nozzle-down" type are used on pressurized containers by inverting the container and tilting the valve to discharge the contents of the container in a downward direction. The valve and valve seat of the tilting valve are located inside the container, with an outwardly-extending hollow or tubular member for tilting the valve to open it and through which the contents are discharged.

When such pressurized containers are in an upright position the valves are in contact with high pressure gas in the upper portion of the container. When inverted, the valves are in contact with the liquid contents of the container.

With such tilting valves there is danger of accidental or inadvertent tilting of the valve stem and opening of the valve, with loss of gas pressure if the container is in an upright position, and with loss of liquid contents if the liquid of the container is in contact with the valve. Accidental or inadvertent dropping of the container may thus result in tilting of the valve and loss of gas pressure or of liquid contents; while touching or wiping of the valve may inadvertently tilt the valve with resulting loss of gas pressure.

The present invention provides a safety device or safety attachment for protecting such tilting valves on such pressurized containers from accidental or inadvertent tilting and loss of gas pressure or liquid contents, but which will permit tilting and use of the valve when this is desired.

The improved safety device or attachment is simple in construction and operation and can readily be applied to existing tilting valves, such as those of the "Clayton" or "Superwhip" type. It can thus be readily applied to the valve after it has been attached to the pressurized container. When so applied, there results an improved pressurized container with a tilting valve of the "nozzle-down" type, with the container protected against accidental or inadvertent tilting of the valve.

The improved safety attachment is advantageously made of only two simple parts, which are rotatable with respect to each other and each having a semi-cylindrical portion, which semi-cylindrical portions, in one relative position, surround the tubular valve stem with a cylindrical protective member, and in another relative position permit the tilting valve stem to be tilted to permit discharge of the liquid contents of the container downwardly through the valve and valve stem.

The improved attachment illustrated has two bottom members each with an upwardly-extending semi-cylindrical portion. One of the semi-cylindrical portions is smaller than the other so that it can rotate within the other through approximately 180°. In one position these two semi-cylindrical members form a cylinder surrounding the tubular valve stem and prevent it from being tilted to open the valve. When one of the semi-cylindrical members is rotated through 180°, they are both on one side of the tilting valve stem which is then free to be tilted away from the semi-cylindrical members to open the valve.

The safety attachments can be made of metal or plastic. Plastic is advantageously used because of its lightness and the ease with which it can be made and attached and held frictionally in place on the top of the pressurized container.

The invention will be further described in connection with the accompanying drawings which illustrate one form of the safety device and its combination with a pressurized container having a tilting valve of the "nozzle-down" type.

In the accompanying drawings.

Figure 1:
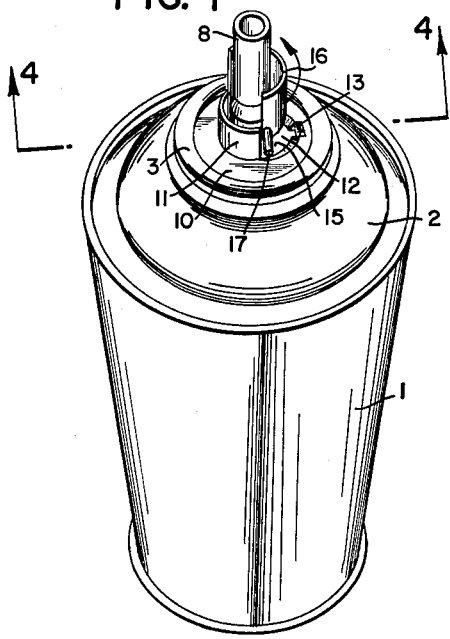
FIG. 1 shows a pressurized container in perspective with the safety attachment applied thereto and in a closed position which protects the valve against accidental tilting and opening.

In the accompanying drawings the pressurized container 1, such as a standard 16-oz. container, has a top portion 2 with a closure portion 3 attached thereto having an opening 4 with the member 5 of flexible plastic material located therein. This member 5 has a valve seat 7 on its lower portion against which the valve 6 is held by the pressure in the container. The member 5 has an extension which extends upwardly into the lower cylindrical portion 9 having an upper tubular discharge portion 8.

Figure 2:
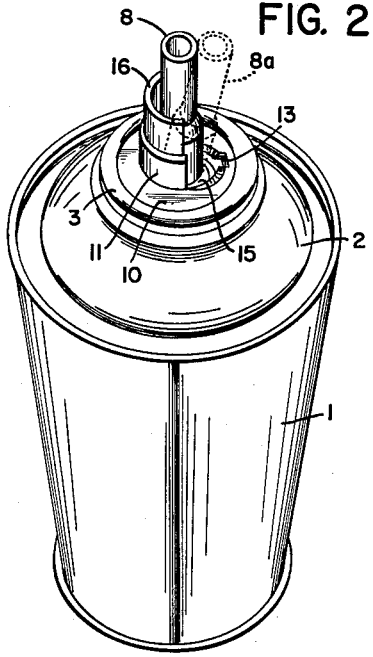
FIG. 2 is a view similar to FIG. 1 but showing the two portions of the safety device in a position such that the valve can be tilted and opened.

The valve construction shown is one of the known forms of tilting valve constructions. The stem of the valve 6 extends upwardly into the tubular members of the valve stem and the valve is operated by tilting the member 8 to positions such as illustrated at 8a in FIG. 2. If, however, the valve is so tilted while the container is in an upright position there is a loss of gas and gas pressure from the top of the container. The dotted line shown in FIG. 2, therefore, is not intended to show normal operation of the tilting valve in an upwardly extending direction, but is intended to illustrate the tilting of the valve when it is inverted and when it is desired to discharge liquid from the bottom of the pressurized container through the tilting valve.

The safety device illustrated has an outer fixed member 10, with an upwardly-extending semi-cylindrical sleeve portion 11. The opening 2 in the member 10 is cut away on one side to permit tilting of the tubular valve stem, and a recess 13 is provided to permit passage of the pin 17 therethrough when the two pieces of the safety attachment are assembled. The member 10 also is cut away to form a recess 14 for receiving the bottom portion 15 of the movable member.

The inner movable member has a bottom portion 15 with an upwardly-extending semi-cylindrical portion 16 and a pin 17 for moving this inner member. The opening in the member 15 is cut away on the side opposite the cylindrical portion to facilitate tilting of the tilting valve when the two semi-cylindrical portions are in alignment, as illustrated in FIG. 1.

Figure 3:
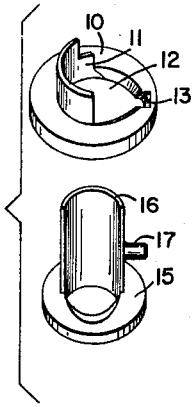
FIG. 3 shows one form of the two separate portions which together form the protective device.

The two pieces shown in FIG. 3 are assembled by inserting the cylindrical portion 16 inside the cylindrical portion 11 to form the assembled attachment shown in the other figures. Movement of the inner member 15 is accomplished by the pin 17. When the two semi-cylindrical members are in the position shown in FIG. 1, the tilting valve member 7 is prevented from tilting in any direction. When, however, the inner member is moved to the position shown in FIG. 2, the two semi-cylindrical members are on the same side of the tilting valve which can be tilted in the opposite direction to open the valve when this is desired, it being understood that the container will be inverted so that the valve, which is a "nozzle-down" type of valve, will discharge its liquid contents downwardly through the tubular member.

Figure 4:
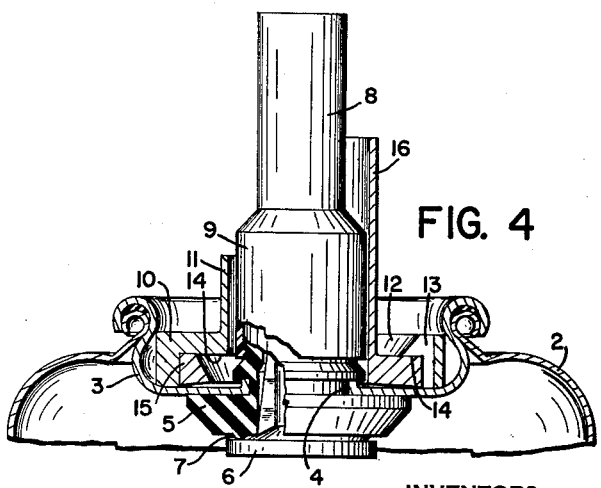
FIG. 4 is an enlarged view taken on the line 4—4 of FIG. 1, and showing one form of tilting valve.

From FIG. 4 it will be seen that the lower member 10 of the outer fixed member of the safety device is of a size which permits it to be inserted through the opening in the closure member 3 so that it will be held frictionally in place by its contact with this closure member. As a result, it is possible to apply the safety attachment to an existing container having such a tilting valve so that no other provision is required to insure that the safety attachment will be held firmly in place.

The two parts of the safety device, such as illustrated in FIG. 3 can readily be made by molding and readily assembled. The assembled safety device can then be attached to the tilting valve, as illustrated in FIG. 4, by forcing the device down into the proper portion of the closure member 3. When made of proper size the device will be held frictionally in place.

The safety device is therefore one which can be readily attached to existing pressurized containers or to valves for such containers without interfering with the normal construction of such containers.

A pressurized container with the safety device attached thereto is protected against accidental or inadvertent tilting of the valve, with resulting loss of gas pressure or liquid contents; but the tilting valve can nevertheless be used, when this is desired, merely by moving one part of the safety device with reference to the other.

We claim:

1. A safety device for use with a tilting valve of the "nozzle-down" type having an outwardly-extending tubular valve tilting member, said safety device comprising an independent unit including two members having cylindrical bases, each having outwardly-extending semi-cylindrical portions, one smaller in diameter than the other and mounted concentrically within the other, said cylindrical members and the semi-cylindrical portions thereof having inside diameters which adapt them to be applied in an enclosing position around and close to such tubular valve-tilting member, said cylindrical members and their outwardly-extending semi-cylindrical portions being rotatable to selectively bring the openings in the semi-cylindrical portions into alignment to permit tilting of the valve from an axial position, and to a position in which the openings in the semi-cylindrical portions are sufficiently closed, each by the other semi-cylindrical portion, to prevent tilting of the valve from an axial position.

2. A tilting valve of the "nozzle-down" type having an outwardly extending tubular valve-tilting member, a safety device for said valve comprising two members having cylindrical bases surrounding said valve each having outwardly extending semi-cylindrical portions partially surrounding and close to said tubular valve-tilting member, one smaller in diameter than the other and mounted concentrically within the other, said cylindrical members and their outwardly extending semi-cylindrical portions being rotatable to selectively bring the openings in the semi-cylindrical portions into alignment to permit tilting of the valve from an axial position, and to a position in which the openings in the semi-cylindrical portions are sufficiently closed, each by the other semi-cylindrical portion, to prevent tilting of the valve from an axial position.

3. A pressurized container having a tiltable valve of the "nozzle-down" type with an outwardly-extending tubular member for tilting the valve to open it, a safety device for said tilting device, and means mounting said safety device on said container in encompassing relation with said tubular tilting member, said safety device comprising two members adapted to be applied to the container around the tubular tilting member, each of said members having an outwardly-extending semi-cylindrical portion, one of said outwardly-extending semi-cylindrical portions being smaller than the other, said members being rotatable, one with respect to the other, into overlapping positions to permit operation of the tubular tilting member and into opposite positions to form a substantial cylinder which prevents operation of the tubular tilting member.

4. A pressurized container having a tiltable valve of the "nozzle-down" type with an outwardly-extending tubular tilting member for tilting the valve to open it, a safety device for said tilting device, and means mounting said safety device on said container in encompassing relation with said tubular tilting member, said safety device comprising two members having cylindrical bases rotatable relative to each other and each having outwardly-extending semi-cylindrical portions, one smaller in diameter than the other and mounted concentrically within the other, said cylindrical members and their outwardly-extending semi-cylindrical portions being rotatable to selectively bring the openings in the semi-cylindrical portions into alignment to permit tilting of the valves from an axial position and to a position in which the openings in the semi-cylindrical portions are sufficiently closed, each by the other semi-cylindrical portion, to prevent tilting of the valve from an axial position.

References Cited in the file of this patent

UNITED STATES PATENTS

| | | |
|---|---|---|
| 2,577,245 | Tuttle et al. | Dec. 4, 1951 |
| 2,703,665 | Soffer et al. | Mar. 8, 1955 |
| 2,706,660 | Johnson et al. | Apr. 19, 1955 |
| 2,868,419 | Casey | Jan. 13, 1959 |